US010167915B2

(12) United States Patent
Titus et al.

(10) Patent No.: US 10,167,915 B2
(45) Date of Patent: Jan. 1, 2019

(54) ACTIVE BRAKE COOLING DUCTS

(71) Applicant: Ford Global Technologies, LLC, Dearborn, MI (US)

(72) Inventors: Matthew Arthur Titus, Livonia, MI (US); Michael Stephen Sylvester, Berkley, MI (US); Andrew Thomas Cunningham, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 15/583,402

(22) Filed: May 1, 2017

(65) Prior Publication Data
US 2018/0313418 A1 Nov. 1, 2018

(51) Int. Cl.
*F16D 65/847* (2006.01)
*B60T 5/00* (2006.01)
*F16D 65/78* (2006.01)

(52) U.S. Cl.
CPC ............. *F16D 65/847* (2013.01); *B60T 5/00* (2013.01); *B60Y 2400/301* (2013.01); *F16D 2065/783* (2013.01)

(58) Field of Classification Search
CPC ........... F16D 65/12; F16D 65/847; B60T 5/00
See application file for complete search history.

(56) References Cited

U.S. PATENT DOCUMENTS

| 8,678,423 | B1* | 3/2014 | Hwang | B60R 19/34 280/495 |
|---|---|---|---|---|
| 8,678,426 | B1 | 3/2014 | Browne et al. | |
| 9,004,241 | B2* | 4/2015 | Browne | B60T 5/00 188/264 A |
| 2012/0318476 | A1* | 12/2012 | Begleiter | B60T 5/00 165/51 |
| 2015/0217734 | A1* | 8/2015 | Cheeseman | B60T 5/00 701/49 |
| 2015/0345578 | A1* | 12/2015 | Nightingale | B60K 11/085 188/264 AA |
| 2016/0272258 | A1* | 9/2016 | Gibson | F16D 65/847 |
| 2017/0299006 | A1* | 10/2017 | Shi | B62D 35/02 |

FOREIGN PATENT DOCUMENTS

| DE | 3834119 | 4/1990 |
|---|---|---|
| DE | 102012017600 | 3/2014 |

OTHER PUBLICATIONS

Singular Motorsports, "Tech Article: Brake Cooling," Oct. 3, 2014, [http://www.singularmotorsports.com/tech-blog-brake-cooling/], 8 pages.

* cited by examiner

*Primary Examiner* — Vishal R Sahni
(74) *Attorney, Agent, or Firm* — Frank MacKenzie; Hanley, Flight & Zimmerman, LLC

(57) ABSTRACT

A brake cooling system includes a brake cooling duct having an air intake and an outlet and an outlet vectoring unit to vary a direction of airflow from the outlet toward a brake assembly for a wheel as the wheel moves during operation of a vehicle.

14 Claims, 8 Drawing Sheets

ACTIVE BRAKE COOLING DUCTS

FIELD OF THE DISCLOSURE

This disclosure relates generally to vehicle braking systems and, more particularly, to active brake cooling ducts.

BACKGROUND

Many passenger vehicles use a braking system including a rotor connected to each wheel and a brake assembly to apply a braking force to the rotor. The brake assembly includes a brake caliper having brake pads selectively movable into contact with and out of contact with the rotor via a motive force applied by the brake caliper (e.g., via a hydraulic brake line controlled by a master brake cylinder, etc.). The brake pads include an outboard brake pad to act on outside or curb-side of the rotor and an inboard brake pad to act on an inside or vehicle-side of the rotor. In some examples, application of pressure to the brake pedal by the driver causes the hydraulic brake fluid, via a master cylinder or brake cylinder assembly, to actuate a piston or pistons to cause the brake pads to move to contact the rotating rotor to retard the rotation of the wheel.

Particularly in high performance vehicles, a potential for overheating of the brake pads is of concern. If the brake pads overheat due to heavy braking, braking effectiveness may be substantially reduced via a phenomena commonly referred to as brake fade. Brake fade is attributable, at least in part, to an alteration of the contact surface of the brake pads referred to as brake pad glazing. Under high temperatures, the high friction material of the brakes pads can crystallize, thereby significantly reducing the coefficient of friction of the brake pads and reducing the ability of the brake pad to grip the rotor and slow the wheel.

SUMMARY

In one example, a brake cooling system includes a brake cooling duct having an air intake and an outlet and an outlet vectoring unit to vary a direction of airflow from the outlet toward a brake assembly for a wheel as the wheel moves during operation of a vehicle.

In another example, a brake cooling system includes a first brake cooling duct extending from a first air intake at a front portion of the vehicle to a first outlet adjacent a first wheel of the vehicle, the first outlet having a first diverter to direct airflow received from the first air intake toward a first brake assembly of the first wheel as the first wheel moves during operation of the vehicle and a brake cooling manager to determine a position of the first diverter responsive to a position of the first brake assembly.

In yet another example, a tangible machine readable storage medium comprising instructions that, when executed, cause a processor to at least determine a position of a brake assembly from vehicle suspension sensor data and actuate a diverter to direct airflow toward the brake assembly as the brake assembly moves during operation of a vehicle.

Figure 1:
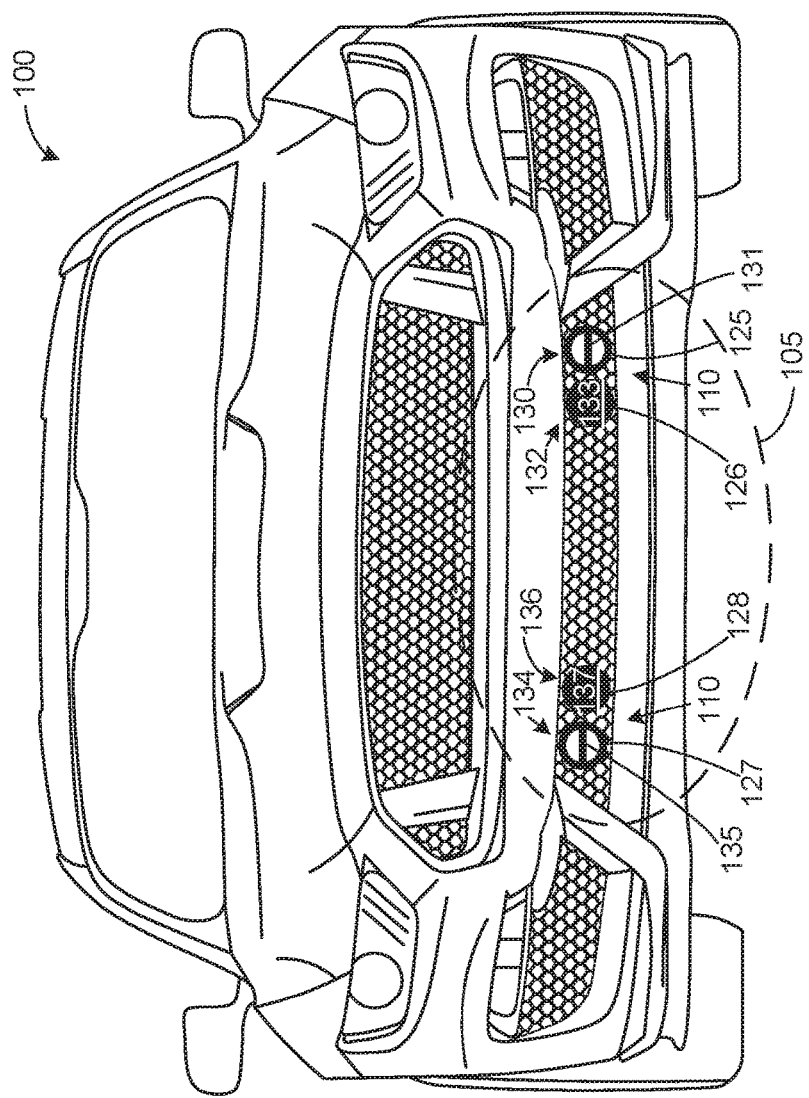
FIG. 1 is a front view of a vehicle including an example implementation of an example brake cooling system in accordance with the teachings of this disclosure.

The figures are not to scale. While the present disclosure is susceptible to various modifications and alternative forms, specific examples are shown and described herein. It should be understood, that the present disclosure is not limited to the particular forms and examples disclosed and instead covers all modifications, equivalents, embodiments, and alternatives falling within the spirit and scope of the present disclosure.

DETAILED DESCRIPTION

As noted above, braking performance may be reduced if the brake pads overheat. This may be particularly critical for high-performance vehicles (e.g., sports cars, etc.) and heavy-duty vehicles (e.g., pick-up trucks, commercial trucks, etc.). Thus, it is desired to cool the brake pads to keep the brakes operating effectively, even during periods of sustained and/or intensive usage. Disclosed herein is an example vehicle brake cooling system to actively cool the brake assembly (e.g., the brake calipers, the brake pads, etc.) during operation of a vehicle.

The example vehicle brake cooling system includes brake cooling ducts to direct air from a first part of the vehicle (e.g., a front fascia, etc.) to the brake calipers of the front and/or rear wheels. Integrated with an outlet of the each brake cooling duct is an outlet vectoring unit having a diverter (e.g., a flap, a deflector, a vane, a slat, a shutter, a nozzle, etc.) to direct air toward the brake assembly. As the vehicle moves, the vehicle suspension and the rotors, and the brake assemblies attached to the rotors, move within an envelope of movement defined by physical limits. For example, a wheel envelope defines all possible positions attainable by a wheel during movement of the wheel (e.g., jounce, rebound, steering motions, impact with a pot hole, impact with a curb, etc.). Consequently, the brake cooling system disclosed herein adapts to the movement of the rotor and brake assembly and uses controllable diverters, such as vanes, at the brake cooling duct outlet vectoring units, to dynamically direct air at the brake assembly to cool the brake assembly as the rotor and brake assembly move during movement of the vehicle.

This adaptation of the brake cooling ducts advantageously avoids misalignment that would occur with a fixed a brake cooling duct. For example, for a fixed brake cooling duct, a suspension compression could cause air to be directed above the brake assembly (e.g., the brake caliper, the brake pads, etc.) and a suspension elongation or rebound could cause air to be directed below the brake assembly. In some examples, a dynamic position of the suspension is determined using vehicle sensors (e.g., ride height sensors, etc.) to provide suspension data. This suspension data (e.g., ride height), or derivatives thereof (e.g., suspension velocity, suspension acceleration, etc.), is used to determine a position of the rotors and the brake assembly which, in turn, is used to determine a direction to which the controllable diverters should be directed at a particular moment.

FIG. 1 is a front view of an example vehicle 100 including an example implementation of an example brake cooling system 105 including example brake cooling ducts 110 to direct airflow to the brake assembly and/or rotors to maintain a temperature of the brake assembly and/or rotors in a desired operating temperature range. In the illustrated example, a front portion of the example vehicle 100 includes one or more example air intake(s) in or about the front fascia of the example vehicle 100. In some examples, the one or more example air intakes are located in the grille, beneath the grille, beneath the bumper, in the hood, or in a chin spoiler or chin splitter.

In the example of FIG. 1, an example first air intake 125, an example second air intake 126, an example third air intake 127 and an example fourth air intake 128 are shown. Each of the example first air intake 125, an example second air intake 126, an example third air intake 127 and an example fourth air intake 128 is dedicated to a separate channel of the example brake cooling system 105. The example first air intake 125 includes an example first air intake airflow regulator 130 and an example first air intake diverter 131 forming a part of a first channel having directing air to a first brake assembly via a first air duct. The example second air intake 126 includes an example second air intake airflow regulator 132 and an example second air intake diverter 133 forming a part of a second channel directing air to a second brake assembly via a second air duct. The example third air intake 127 includes an example third air intake airflow regulator 134 and example third diverter 135 forming a part of a third channel directing air to a third brake assembly via a third air duct. The example fourth air intake 128 includes an example fourth air intake airflow regulator 136 and example fourth diverter 137 forming a part of a fourth channel directing air to a fourth brake assembly via a fourth air duct.

Each example diverter (e.g., the first air intake diverter 131, etc.) regulates airflow entering the respective air intake airflow regulators (e.g., the first air intake airflow regulator 130, etc.) and the example diverter can be moved to a selected position between, and including, a fully closed position (e.g., substantially no airflow through the first air intake airflow regulator 130, etc.) and a fully open position (e.g., substantially full airflow through the first air intake airflow regulator 130, etc.). In some examples, the first air intake diverter 131, the second air intake diverter 133, the third air intake diverter 135 and/or the fourth air intake diverter 137 include a single diverter such as a flap, vane, slat, or a valve (e.g., a butterfly valve, etc.) controlled via a motor, an actuator, or another motive force to isolate or to permit airflow into the respective one of the first air intake airflow regulator 130, the second air intake airflow regulator 132, the third air intake airflow regulator 134 or the fourth air intake airflow regulator 136. In some examples, the first air intake diverter 131, the second air intake diverter 133, the third air intake diverter 135 and/or the fourth air intake diverter 137 include a plurality of diverters such as movable slats, flaps, vanes, louvers or shutters controlled via a motor, an actuator, or another motive force to isolate or to permit airflow into the respective one of the first air intake airflow regulator 130, the second air intake airflow regulator 132, the third air intake airflow regulator 134 or the fourth air intake airflow regulator 136.

In some examples, a single example air intake airflow regulator (e.g., the first air intake airflow regulator 130) is used to control airflow into plurality of brake cooling channels (e.g., the first channel and the second channel directed to the driver side of the vehicle, the first channel and the third channel directed to the front wheels, etc.) via one or more example diverters.

In some examples, the first air intake airflow regulator 130, the second air intake airflow regulator 132, the third air intake airflow regulator 134 and/or the fourth air intake airflow regulator 136 include a filter to filter airborne particulates or other airborne objects prior to introduction of the airflow into the respective brake cooling system channel (s).

Figure 2:
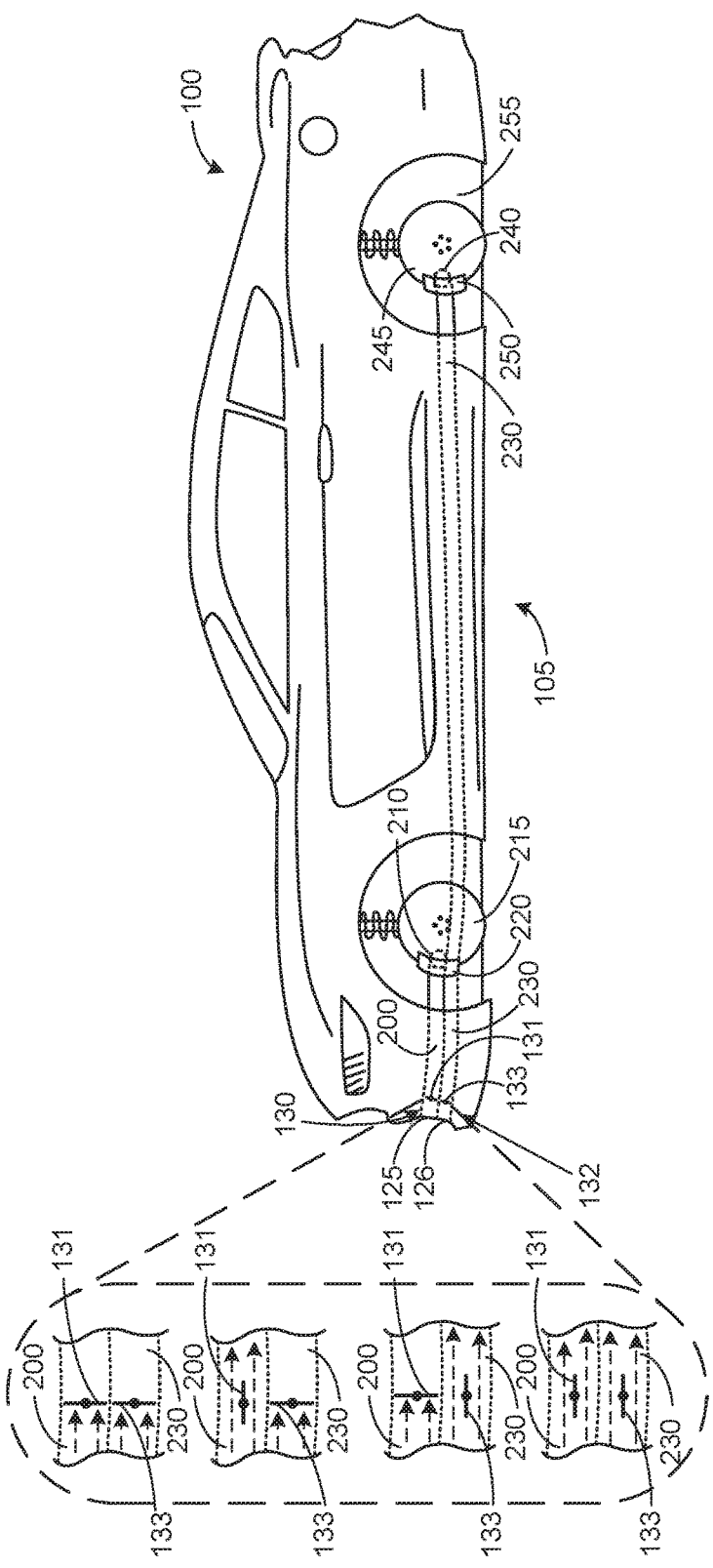
FIG. 2 is an example side view of an example implementation of the example brake cooling system of FIG. 1.

FIG. 2 is an example side view of the example vehicle 100 of FIG. 1 showing the example brake cooling system 105 of FIG. 1. FIG. 2 shows an example first brake cooling duct 200 of the first channel of the example brake cooling system 105 extending from the example first example air intake airflow regulator 130 in the front fascia of the example vehicle 100 to an example first air outlet 210 adjacent an example first rotor 215 and an example first brake assembly 220 of the example vehicle 100. An example second brake cooling duct 230 of the second channel of the example brake cooling system 105 extends from the example second air intake airflow regulator 132 in the front fascia of the example vehicle 100 to an example second air outlet 240 adjacent an example second rotor 245 and an example second brake assembly 250 of the example vehicle 100.

As noted above, the example first air intake 125 and the example second air intake 126 may be disposed in the grille, beneath the grille, beneath the bumper, in the hood, or in a chin spoiler or chin splitter. In some examples, the example second air intake 126 for the example second brake cooling duct 230 and/or the example fourth air intake 128 may be disposed in a location other than the front fascia of the example vehicle 100. For example, the second brake cooling duct 230 may extend from an example second air intake airflow regulator 132 in a side portion of the example vehicle 100. For instance, the example second air intake 126 may include a side scoop disposed in a quarter panel fore of the rear wheel well 255.

The example first air intake airflow regulator 130, including the example first air intake 125 and the one or more example first air intake air intake diverters 131, is to regulate airflow into the example first brake cooling duct 200 by moving the example first air intake diverter(s) 131 to a selected position between and including a fully open position and a fully closed position. The example second air intake airflow regulator 132, including the example second air intake 126 and the one or more example second air intake diverters 133, is to regulate airflow into the example second brake cooling duct 230 by moving the example second air intake diverter(s) 133 to a selected position between and including a fully open position and a fully closed position.

The left portion of FIG. 2 shows a variety of states of the example first air intake diverter(s) 131 and the example second air intake diverter(s) 133. The top image shows both the example first air intake air intake diverters 131 and the example second air intake diverters 133 in the fully closed position to occlude, respectively, the example first brake cooling duct 200 and the example second brake cooling duct 230. The second image from the top image shows the example first air intake diverter 131 in a fully open position to permit substantially unimpeded airflow, represented by arrows having dashed lines, through the example first brake cooling duct 200 and the example second air intake diverter 133 in the fully closed position to occlude the example second brake cooling duct 230. The third image from the top image shows the example first air intake diverter 131 in a fully closed position to occlude the example first brake cooling duct 200 and the example second air intake diverter 133 in the fully open position to permit substantially unimpeded airflow through the example second brake cooling duct 230. The bottom image shows the example first air intake diverter 131 and the example second air intake diverter 133 in a fully open position to permit substantially unimpeded airflow through the example first brake cooling duct 200 and the example second brake cooling duct 230. Although the examples illustrate positioning of the example first air intake diverter 131 and the example second air intake diverter 133 in a fully open or a fully closed position, the example first air intake diverter 131 and/or the example second air intake diverter 133 may be selectively positioned at any positions intermediate to the fully open or the fully closed positions.

Figure 3:
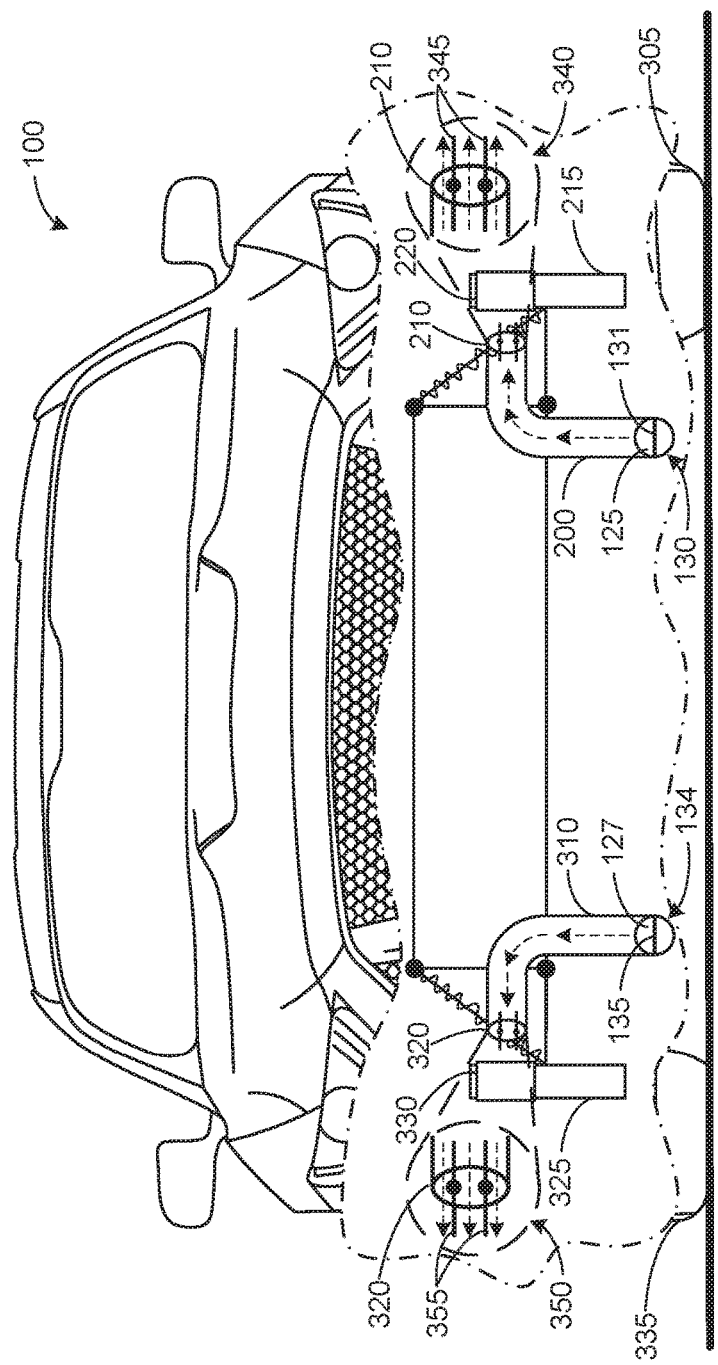
FIG. 3 is an example cut away front view the example brake cooling system of FIGS. 1-2.

FIG. 3 is an example cut away front view of the example brake cooling system 105 of FIGS. 1-2. FIG. 3 shows the example first brake cooling duct 200 of FIG. 2 extending from the example first air intake 125 in a lower portion of the front fascia of the example vehicle 100 to the example first air outlet 210 adjacent the example first rotor 215 and the example first brake assembly 220 corresponding to the front left wheel 305 of the example vehicle 100. FIG. 3 also shows a third brake cooling duct 310 extending from an example third intake 127 in the lower front fascia of the example vehicle 100 to an example third outlet 320 adjacent an example third rotor 325 and an example third brake assembly 330 corresponding to a front right wheel 335 of the example vehicle 100. The example first air intake 125 is shown to include the example first air intake airflow regulator 130 having one or more first air intake diverters 131 and the example third air intake 127 is shown to include an example third air intake airflow regulator 134 having one or more third air intake diverters 135.

FIG. 3 shows the example first air outlet 210 to include an example first outlet vectoring unit 340 having one or more first diverters 345 to direct airflow from the first air outlet 210 toward the example first brake assembly 220 for the wheel 305 as the wheel 305 moves within during operation of the example vehicle 100. FIG. 3 also shows the example third outlet 320 to include an example third outlet vectoring unit 350 having one or more third diverters 355 to direct airflow from the example third outlet 320 toward the example third brake assembly 330 for the wheel 335 as the wheel 335 moves during operation of the example vehicle 100. In the example of FIG. 3, the example vehicle 100 is shown to be on a level surface with an equal lateral weight distribution, with the first diverter(s) 345 of the example first outlet vectoring unit 340 being positioned to direct air laterally toward the example second brake assembly 250 and the third diverter(s) 355 of the example third outlet vectoring unit 350 being positioned to direct air laterally toward the example third brake assembly 330. A position of the one or more first diverters 345 of the example first outlet vectoring unit 340 and/or the one or more third diverters 355 of the example third outlet vectoring unit 350 is controlled via a motor, an actuator, or another motive force.

Figure 4A:
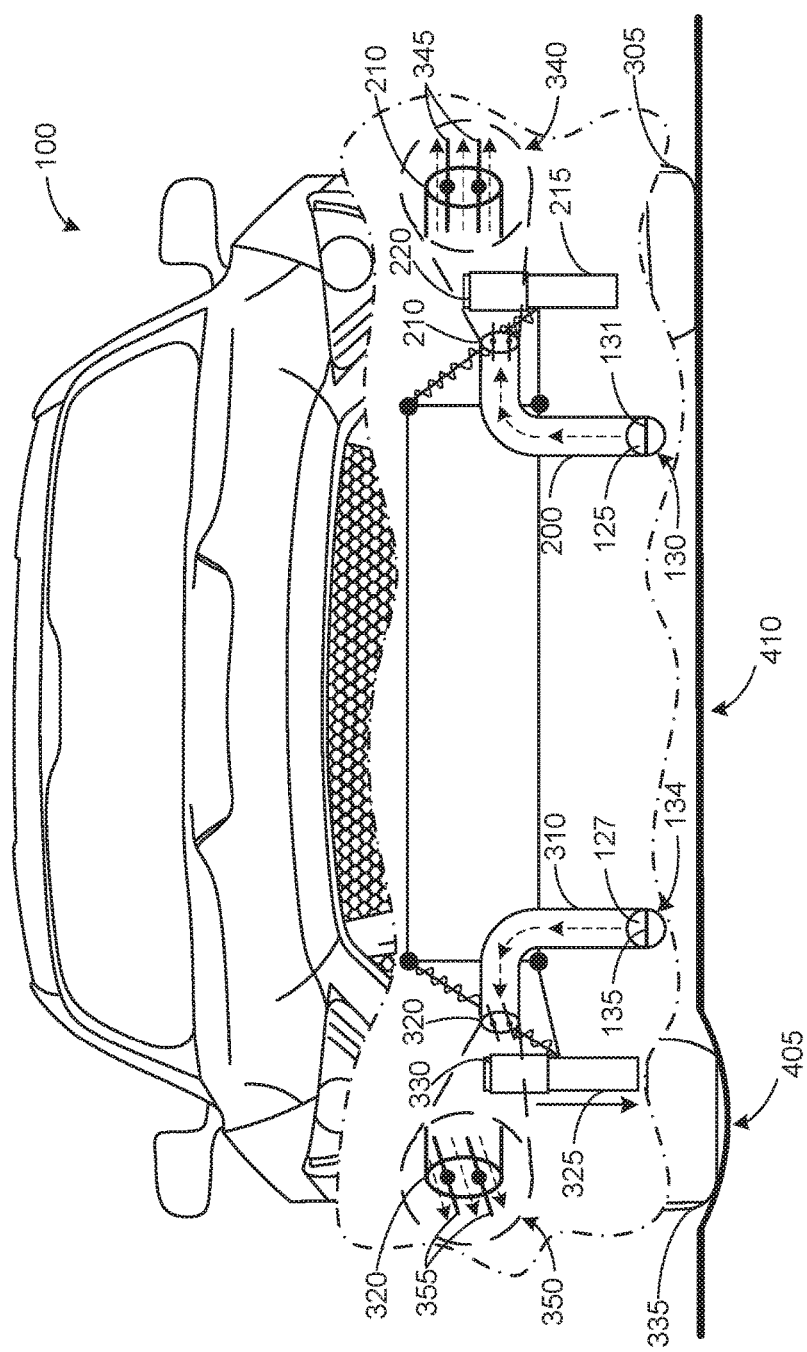
FIGS. 4A-4B are cut away front views of the system of FIGS. 1-2 wherein the example diverters of example outlet vectoring units are directed toward an example brake assembly in a low position (FIG. 4A) and toward an example brake assembly in a high position (FIG. 4B).

FIG. 4A shows the example vehicle 100 of FIG. 3 wherein the example wheel 335, the example third rotor 325 and the example third brake assembly 330 move downwardly in the direction of the arrow to a low position, compared to FIG. 3, responsive to a depression 405 in a road surface 410. Responsive to the change in position of the example third brake assembly 330, the example third diverter(s) 355 of the example third outlet vectoring unit 350 are positioned to direct air laterally and downwardly toward the example third brake assembly 330. As a position of the wheel 305 in FIG. 4 is unchanged from the position indicated in FIG. 3, the first diverter(s) 345 of the example first outlet vectoring unit 340 has not changed a direction of airflow output from the example first outlet vectoring unit 340.

Figure 4B:
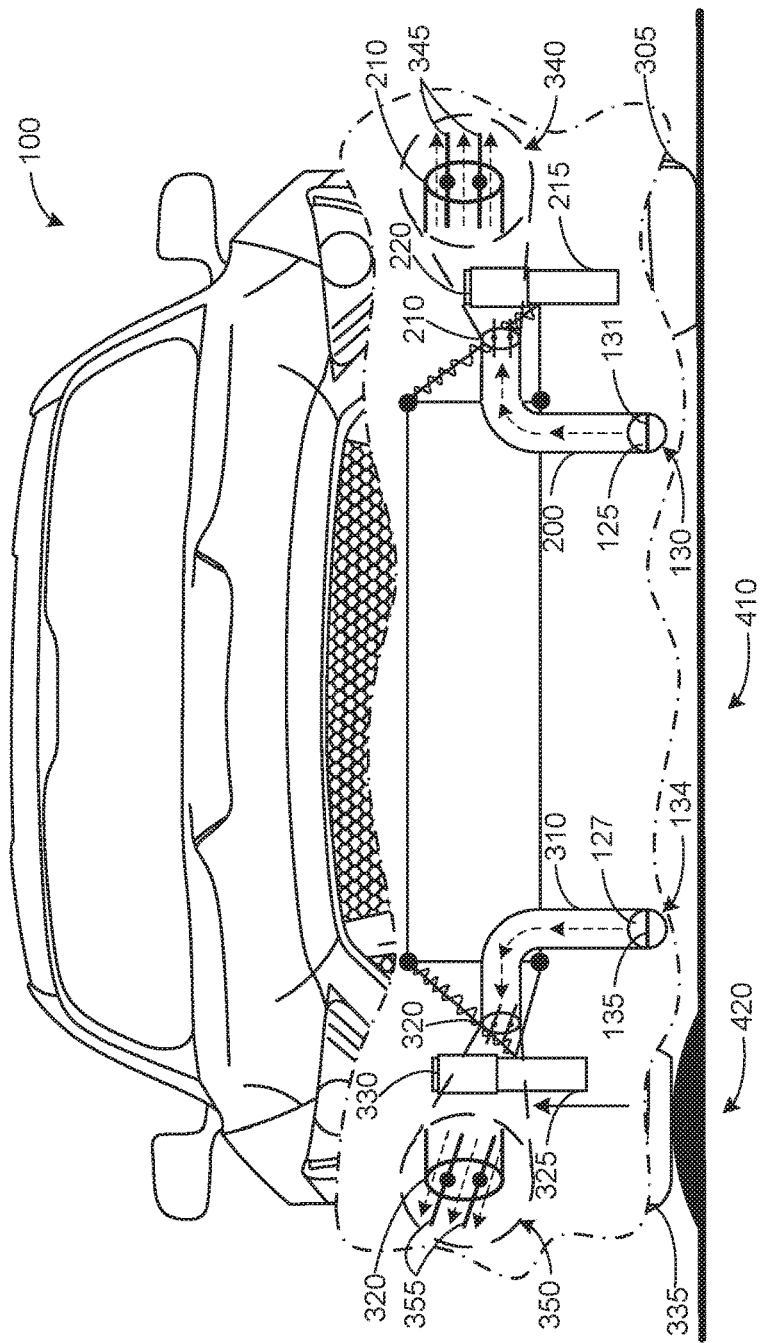

FIG. 4B shows the example vehicle 100 of FIG. 3 wherein the example wheel 335, the example third rotor 325 and the example third brake assembly 330 move upwardly in the direction of the arrow to a high position, compared to FIG. 3, responsive to a bump 420 or high spot in a road surface 410. Responsive to the change in position of the example third brake assembly 330, the example third diverter(s) 355 of the example third outlet vectoring unit 350 are positioned to direct air laterally and upwardly toward the example third brake assembly 330. As a position of the wheel 305 in FIG. 4 is unchanged from the position indicated in FIG. 3, the example first diverter(s) 345 of the example first outlet vectoring unit 340 have not changed a direction of airflow output from the example first outlet vectoring unit 340.

In other examples, all of the wheels of an example vehicle are all in contact with a level road surface 410, but a position of the example vehicle suspension and chassis is shifted relative to the wheels due to acceleration experienced along one or more axes. For instance, for a left hand corner, the chassis of the example vehicle 100 of FIG. 4B would move closer to the example third brake assembly 330 and move further from the and the example first brake assembly 220 in the Z direction or vertical direction of FIG. 4B. Since the first outlet vectoring unit 340 and the third outlet vectoring unit 350 are attached to the chassis, the first diverter(s) 345 and the example third diverter(s) 355, if needed during the cornering event, would be vectored to accommodate the relative movement between the example first brake assembly 220 and the example first diverter(s) 345 and the between the example third brake assembly 330 and the example third diverter(s) 355. Similarly, a deceleration of the example vehicle 100 causes a motion along the longitudinal axis of the example vehicle 100 to alter a pitch of the example vehicle 100 (e.g., a load transfer from the rear suspension to the front suspension causing the front of the example vehicle 100 to "dive" relative to the rear of the example vehicle 100). Likewise, an acceleration of the example vehicle 100 also causes a motion along the longitudinal axis of the example vehicle 100 to alter a pitch of the example vehicle 100 (e.g., a load transfer from the front suspension to the rear suspension causing the back of the example vehicle 100 to "squat" downwardly relative to the front of the example vehicle 100). In such examples, and with reference to FIG. 2, the first outlet vectoring unit 210 and the second outlet vectoring unit 240 on the driver side of the example vehicle 100 would adjust their corresponding diverters, if needed during the acceleration or deceleration event, to accommodate the relative movement between the example first brake assembly 220 and the example second brake assembly 250, as would the corresponding outlet vectoring units and diverters on the passenger side of the example vehicle 100.

Figure 5:
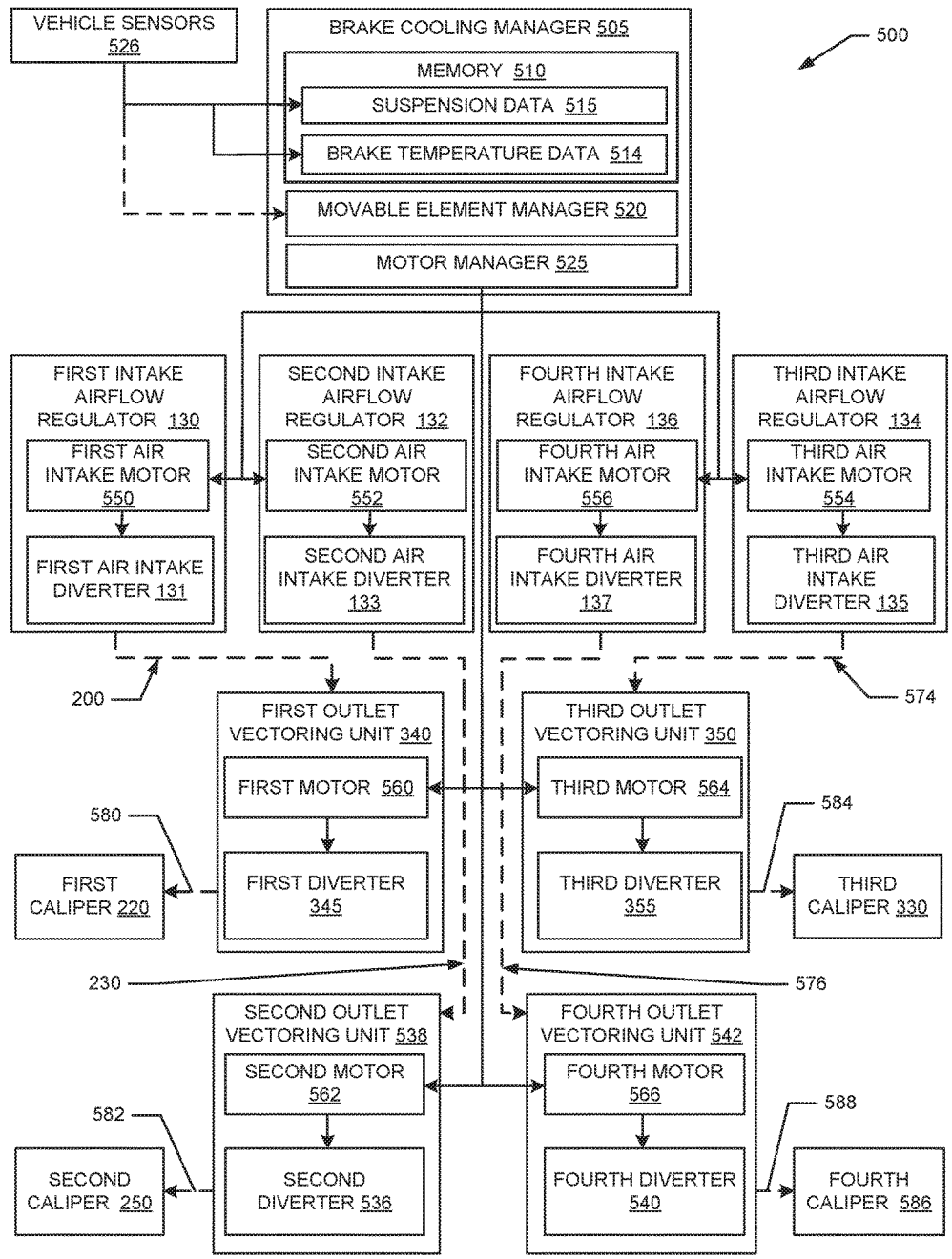
FIG. 5 is a block diagram of an example implementation of the example brake cooling system of FIGS. 1-4B and an example brake cooling manager in accordance with the teachings of this disclosure.

FIG. 5 is a block diagram of an example brake cooling system 500 and an example brake cooling manager 505 including an example memory 510. The memory includes example brake temperature data 514 and example suspension data 515. The brake cooling manager 505 also includes an example diverter manager 520, and an example motor manager 525. The example brake cooling manager 505 uses vehicle information obtained from example vehicle sensors 526 (e.g., contact temperature sensor, non-contact temperature sensor, speed sensor, air intake temperature sensor, diverter position sensor, brake duct mass airflow sensor, etc.) to automatically adjust application of a direction of cooling air from the brake cooling ducts to the brakes and/or the rotors as the suspension, and correspondingly the brakes and/or the rotors, move during movement of the example vehicle 100. Other example implementations of the example brake cooling manager 505 may include fewer or additional structures. For instance, as represented in FIG. 5, instead of outputting the example brake temperature data 514 and/or the example suspension data 515 from the example vehicle sensors 526 to the example memory 510, the example vehicle sensors 526 may output the example brake temperature data 514 and/or the example suspension data 515 directly to the example diverter manager 520 for on-the-fly or real-time adjustment (e.g., without trending, averaging, etc.) by the example diverter manager 520.

The example vehicle sensors 526 may include, for example, inertial sensors (e.g., an inertial measurement unit (IMU) including one or more accelerometers to measure vehicle specific forces such as rotations and/or accelerations, etc.), suspension height sensors, brake pressure sensors and/or brake temperature. For instance, suspension height sensors on the example vehicle's 100 suspension control arms can provide an exact position of an example brake assembly (e.g., the example third brake assembly 330, etc.), or a position from which the exact position of the example brake assembly may be determined, at any position of the suspension travel. In some examples, the example brake temperature data 514 includes temperature data from one or more temperature sensors disposed in contact with and/or adjacent to (e.g., not in contact with, such as infrared (IR) sensors, etc.) inboard and/or outboard surfaces of the brake rotors (e.g., 215, 245 of FIG. 2, etc.) and/or the brake assemblies (e.g., 220, 250 of FIG. 2, etc.).

In some examples, the example diverter manager 520 is to determine a position of each of the diverters (e.g., the example first diverter(s) 345, the example third diverter(s) 355, etc.) of the outlet vectoring units (e.g., the example first outlet vectoring unit 340, the example third outlet vectoring unit 350, etc.) and to determine a movement required of each diverter to vary the direction of the airflow (e.g., toward the brake assembly for the respective wheel) responsive to the brake temperature data 514 and the suspension data 515 from the vehicle sensors 526. In some examples, the example diverter manager 520 is to determine a position of and/or a required movement of, each of the air intake diverters (e.g., the example first air intake diverter(s) 131, the example second air intake diverter(s) 133, etc.) of the air intake airflow regulators (e.g., the example first air intake airflow regulator 130, the example second air intake airflow regulator 132, etc.) responsive to the brake temperature data 514 and the suspension data 515 from the vehicle sensors 526. In the illustrated examples of FIGS. 3 and 4A-4B, the example first outlet vectoring unit 340 includes, as the example first diverter(s) 345, a plurality of rotatable vanes or slats and the example third outlet vectoring unit 350 include includes, as the example third diverter(s) 355, a plurality of rotatable vanes or slats. Correspondingly, in these examples, the example diverter manager 520 is to determine an angular or rotational movement to apply to the diverters (e.g., the example third diverter(s) 355) to direct the airflow toward a corresponding brake assembly (e.g., the example third brake assembly 330) as the brake assembly moves during movement of the example vehicle 100. In some examples, the example diverter includes a rotatable nozzle disposed adjacent a brake assembly and the example diverter manager 520 is to determine a rotational movement to apply to the rotatable nozzle to direct the airflow toward the brake assembly as the brake assembly moves during movement of the example vehicle 100.

In some examples, the example diverter manager 520 is to determine a movement to apply to one or more of the example diverter(s) including, but not limited to, the example first air intake diverter(s) 131 of the example first air intake airflow regulator 130, the example second air intake diverter(s) 133 of the example second air intake airflow regulator 132, the example third air intake diverter(s) 135 of the example third air intake airflow regulator 134, an example fourth air intake diverter(s) 137 of an example fourth air intake airflow regulator 136, the example first diverter(s) 345 of the example first outlet vectoring unit 340, an example second diverter(s) 536 of an example second outlet vectoring unit 538, the example third diverter(s) 355 of the example third outlet vectoring unit 350, and/or an example fourth diverter(s) 540 of an example fourth outlet vectoring unit 542.

In some examples, following a determination by the example diverter manager 520 of a required movement for a particular diverter (e.g., the example third diverter(s) 355, etc.), the example motor manager 525 is to determine an instruction required to control a corresponding motor to implement the required movement (e.g., rotational movement in a first direction, rotational movement in a second direction, translational, etc.) of the diverter(s). In some examples, the example motor manager 525 controls an operation of one or more of an example first air intake motor 550 of the example first air intake airflow regulator 130, an example second air intake motor 552 of the example second air intake airflow regulator 132, an example third air intake motor 554 of the example third air intake airflow regulator 134, an example fourth air intake motor 556 of the example fourth air intake airflow regulator 136, an example first motor 560 of the example first outlet vectoring unit 340, an example second motor 562 of the example second outlet vectoring unit 538, an example third motor 564 of the example third outlet vectoring unit 350, and/or an example fourth motor 566 of the example fourth outlet vectoring unit 542.

FIG. 5 depicts a representation of an airflow in the example first brake cooling duct 200 from the example first air intake airflow regulator 130 to the first outlet vectoring unit 340, an airflow in the example second brake cooling duct 230 from the second air intake airflow regulator 132 to the second outlet vectoring unit 538, an airflow from the example third air intake airflow regulator 134 in an example third brake cooling duct 574 to the example third outlet vectoring unit 350, and an airflow in an example fourth brake cooling duct 576 from the example fourth air intake airflow regulator 136 to the example fourth outlet vectoring unit 542. FIG. 5 also depicts a representation of an airflow from the example first outlet vectoring unit 340 to the example first brake assembly 220 via a dashed line 580, an airflow from the second outlet vectoring unit 538 to the second brake assembly 250 via a dashed line 582, an airflow from the example third outlet vectoring unit 350 to the example third brake assembly 330 via a dashed line 584, and an airflow from the example fourth outlet vectoring unit 542 to an example fourth caliper 586 via a dashed line 588.

The example brake cooling manager 505 (e.g., the memory 510) of FIG. 5 may include, or may be implemented by, any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in operative association with the example brake cooling manager 505 may be stored in any file and/or data structure format, organization scheme, and/or arrangement. In some examples, the information stored in operative association with the example brake cooling manager 505 is accessible to a vehicle control module and/or vehicle communication device.

While an example manner of implementing the example brake cooling manager 505 is illustrated in FIG. 5, one or more of the elements, processes and/or devices illustrated in FIG. 5 may be combined, divided, re-arranged, omitted, eliminated and/or implemented in any other way. Further, the example brake cooling manager 505, the example memory 510, the example diverter manager 520, and the example motor manager 525 of FIG. 5 may be implemented by a semiconductor device such as a processor. The example brake cooling manager 505, the example memory 510, the example diverter manager 520, and the example motor manager 525 of FIG. 5 may also be implemented by hardware, software, firmware and/or any combination of hardware, software and/or firmware. Thus, for example, any of the example brake cooling manager 505, the example memory 510, the example suspension data 515, the example diverter manager 520, and the example motor manager 525 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example brake cooling manager 505, the example memory 510, the example diverter manager 520, and the example motor manager 525 of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example brake cooling manager 505 of FIG. 5 may include one or more elements, processes and/or devices in addition to, or instead of, those illustrated in FIG. 5, and/or may include more than one of any or all of the illustrated elements, processes and devices.

Figure 6:
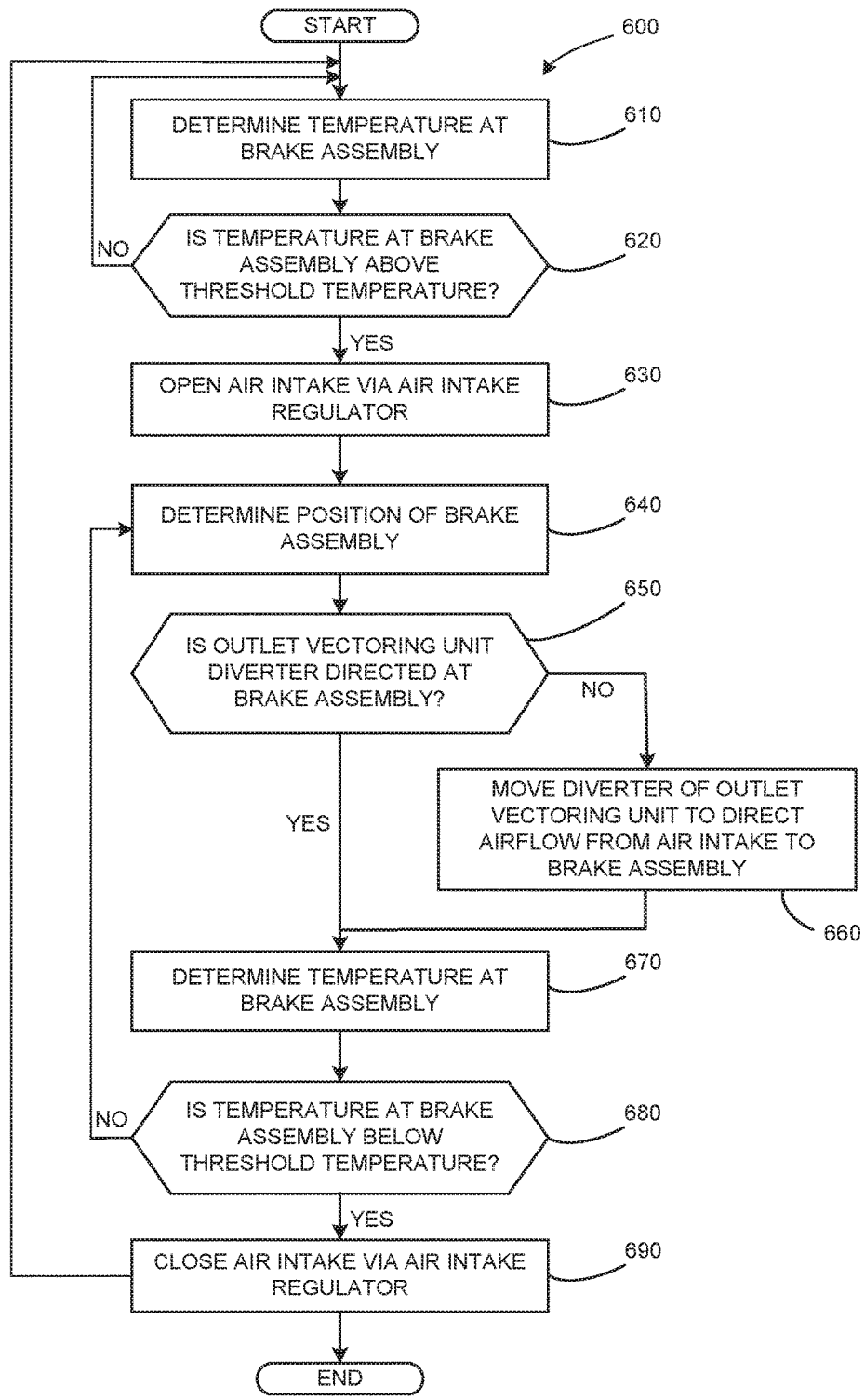
FIG. 6 is a flowchart representative of a method that may be performed to implement the example brake cooling manager of FIG. 5.

A flowchart representative of an example method 600 for implementing the example brake cooling manager 505 of FIG. 5 is shown in FIG. 6. The method 600 of FIG. 6 automatically adjusts application of a direction of cooling air from the brake cooling ducts to the brakes and/or the rotors as the suspension, and correspondingly the brakes and/or the rotors, move during movement of the example vehicle 100. In the example of FIG. 6, the method 600 may be implemented using machine-readable instructions that comprise one or more program(s) for execution by a processor such as the example processor 712 of the example processor platform 700 discussed below in connection with FIG. 7. The one or more program(s) may be embodied in software stored on a tangible computer readable storage medium such as a CD-ROM, a floppy disk, a hard drive, a digital versatile disk (DVD), a Blu-ray disk, a solid-state memory, or a memory associated with the processor 712, but the entire program(s) and/or parts thereof could alternatively be executed by a device other than the processor 712 and/or embodied in firmware or dedicated hardware. Further, although the example program(s) is/are described with reference to the flowchart illustrated in FIG. 6, many other methods for implementing the example brake cooling manager 505 of FIG. 5 may alternatively be used. For example, the order of execution of the blocks may be changed, and/or some of the blocks described may be changed, eliminated, or combined.

In some examples, the example method 600 of FIG. 6 is implemented via the example brake cooling manager 505, the example memory 510, the example suspension data 515, the example brake temperature data 514, the example diverter manager 520, the example motor manager 525 to automatically adjust application of a direction of cooling air from the brake cooling ducts to the brakes and/or the rotors as the suspension, and correspondingly the brakes and/or the rotors, move during movement of the example vehicle 100. Coded instructions (e.g., computer and/or machine-readable instructions) corresponding to the example method 600 are stored on a tangible computer readable storage medium such as a hard disk drive, a flash memory, a read-only memory (ROM), a compact disk (CD), a digital versatile disk (DVD), a solid-state storage device, a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method 600 of FIG. 6 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a solid-state storage device a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 600 begins at block 610 when the example brake cooling system 105 determines a temperature at a brake assembly (e.g., at a brake pad, etc.) and/or rotor via temperature data obtained via one or more vehicle sensors 526, such as the brake temperature data 514. For instance, during movement of the example vehicle 100, the example brake cooling manager 505 continuously or intermittently monitors the temperature at the brake assembly and/or rotor for each of the wheels of the vehicle 100.

In some examples, the example method 600 determines at block 620, via the example brake temperature data 514, whether the temperature at any of the brake assemblies and/or rotors exceeds a threshold temperature (e.g., 450° F., 475° F., 500° F., etc.). In some examples, the threshold temperature for the front brakes of an example vehicle 100 is different than the threshold temperature for the rear brakes of the example vehicle 100. If the result of block 620 is "NO" for each wheel, control returns to block 610 for continued monitoring of the temperature at the brake assemblies and/or rotors. In some examples, where the brake temperature is low and within normal operating parameters, the example brake cooling system 105 is not activated and the first air intake airflow regulator 130, the second air intake airflow regulator 132, the third air intake airflow regulator 134, and the fourth air intake airflow regulator 136 are closed or "blanked" to reduce drag and to enhance fuel efficiency. If the temperature at any brake assembly and/or rotor is above the threshold temperature (i.e., the result of block 620 is "YES") control passes to block 630.

At block 630, if the temperature at the brake assembly, brake pad and/or rotor exceeds the threshold temperature, the example brake cooling manager 505 uses the example diverter manager 520 and the example motor manager 525 to open an air intake airflow regulator (e.g., the first air intake airflow regulator 130) for the particular brake assembly, brake pad and/or rotor (e.g., the example first brake assembly 220) that is above the threshold temperature. For instance, after spirited driving, the example first brake assembly 220 and the example third brake assembly 330 of the example vehicle 100 of FIG. 3 may each register a temperature (e.g., 500° F.) in excess of the threshold temperature (e.g., 475° F.), whereas the example second brake assembly 250 and the example fourth caliper 586 of the example vehicle each register a temperature (e.g., 450° F.) below the threshold temperature, such temperature data being provided by the vehicle sensors 526 via the example brake temperature data 514 and/or the example diverter manager 520. Responsive thereto, the example brake cooling manager 505 opens the example first air intake airflow regulator 130 and the example third air intake airflow regulator 134, via the example diverter manager 520 and the example motor manager 525, to provide airflow to the example first brake assembly 220 and the example third brake assembly 330 to provide cooling airflow to reduce the temperature to a value below the threshold temperature.

At block 640, the example brake cooling manager 505 determines a position of each brake assembly and/or rotor that is above the threshold temperature using the example suspension data 515. For instance, an output of an example vehicle sensor 526, such as a suspension height sensor on the example vehicle's 100 upper control arm or lower control arm, or elsewhere, is correlated to an exact position in space of a corresponding example brake assembly (e.g., via a look up table in example memory 510 or example suspension data 515).

At block 650, the example brake cooling manager 505 determines whether a position of a particular outlet vectoring unit's diverter(s) are directed at the respective brake assembly and/or rotor that is above the threshold temperature. For example, an angle of the outlet vectoring unit's diverters (e.g., a position known via a rotary encoder operatively associated with a motor controlling a position of the outlet vectoring unit's diverters, etc.) is compared to an angle of the example brake assembly relative thereto. If the result of block 650 is "NO," control passes to block 660. If the example outlet vectoring unit's diverter(s) is determined to already be directed at the respective brake assembly and/or rotor (block 650 is "YES"), control passes to block 670.

At block 660, the example brake cooling manager 505 uses the example diverter manager 520 and the example motor manager 525 to direct the diverter (e.g., the first diverter 345, etc.) of the outlet vectoring unit (e.g., the first outlet vectoring unit 340, etc.) toward the brake assembly and/or rotor (e.g., the example first brake assembly 220, etc.) that is above the threshold temperature using the position of the brake assembly and/or rotor determined at block 640.

At block 670, the example brake cooling manager 505 determines the temperature at the brake assembly and/or rotor (e.g., the example first brake assembly 220) using the example brake temperature data 514. Control then passes to block 680 where the example brake cooling manager 505 determines if the temperature at the brake assemblies and/or rotors determined at block 620 to exceed the threshold temperature are below the threshold temperature.

If the result of block 680 is "YES," control passes to block 690, where the example brake cooling manager 505 uses the example diverter manager 520 and the example motor manager 525 to close the air intake airflow regulator corresponding to the respective brake assembly and/or rotor. For instance, if the example brake cooling manager 505 previously opened the first air intake airflow regulator 130 responsive to a determination that the example first brake assembly 220 had a temperature above a threshold temperature (e.g., a factory-set threshold temperature, a suspension mode-dependent threshold temperature, a user-selected threshold temperature, etc.), the example brake cooling manager 505 continues to monitor the temperature of the example first brake assembly 220, via the example brake temperature data 514, and closes the first air intake airflow regulator 130, via the example diverter manager 520 and the example motor manager 525, when it determines that the example first brake assembly 220 temperature is below the threshold temperature.

If the result of block 680 is "NO," control passes to block 640 and the example brake cooling manager 505 determines a position of each brake assembly, brake pad and/or rotor that is above the threshold temperature via the example suspension data 515. For instance, at a time T0, the example brake cooling manager 505 opens the example first air intake airflow regulator 130, via the example diverter manager 520 and the example motor manager 525, responsive to a determination that the example first brake assembly 220 has a temperature above a threshold temperature. A subsequent temperature measurement of the example first brake assembly 220 at time T1 subsequent to time T0 determines that the temperature of the example first brake assembly 220 is still above the threshold temperature following application of brake cooling between times T0 and T1 via the first outlet vectoring unit 340. The example brake cooling manager 505 determines a position of the example first brake assembly 220 at time T1, using the example suspension data 515, so that the first diverter(s) 345 can continue to be directed toward the example first brake assembly 220 as the example first brake assembly 220 moves during movement of the example vehicle 100. In such example, this process continues until the temperature of the example first brake assembly 220 is determined to be below the threshold temperature at block 680.

As noted above, FIG. 7 is a block diagram of an example processor platform 700 capable of executing instructions to implement the method of FIG. 6, the example brake cooling manager 505 of FIG. 5 and the example brake cooling system 105 of FIGS. 1-5. The processor platform 700 may be implemented by a server, a desktop computer, a laptop computer, a terminal, a dedicated device, a control module, a microcomputer, a microcontroller, a vehicle electronic control unit, or any other type of computing device.

Figure 7:
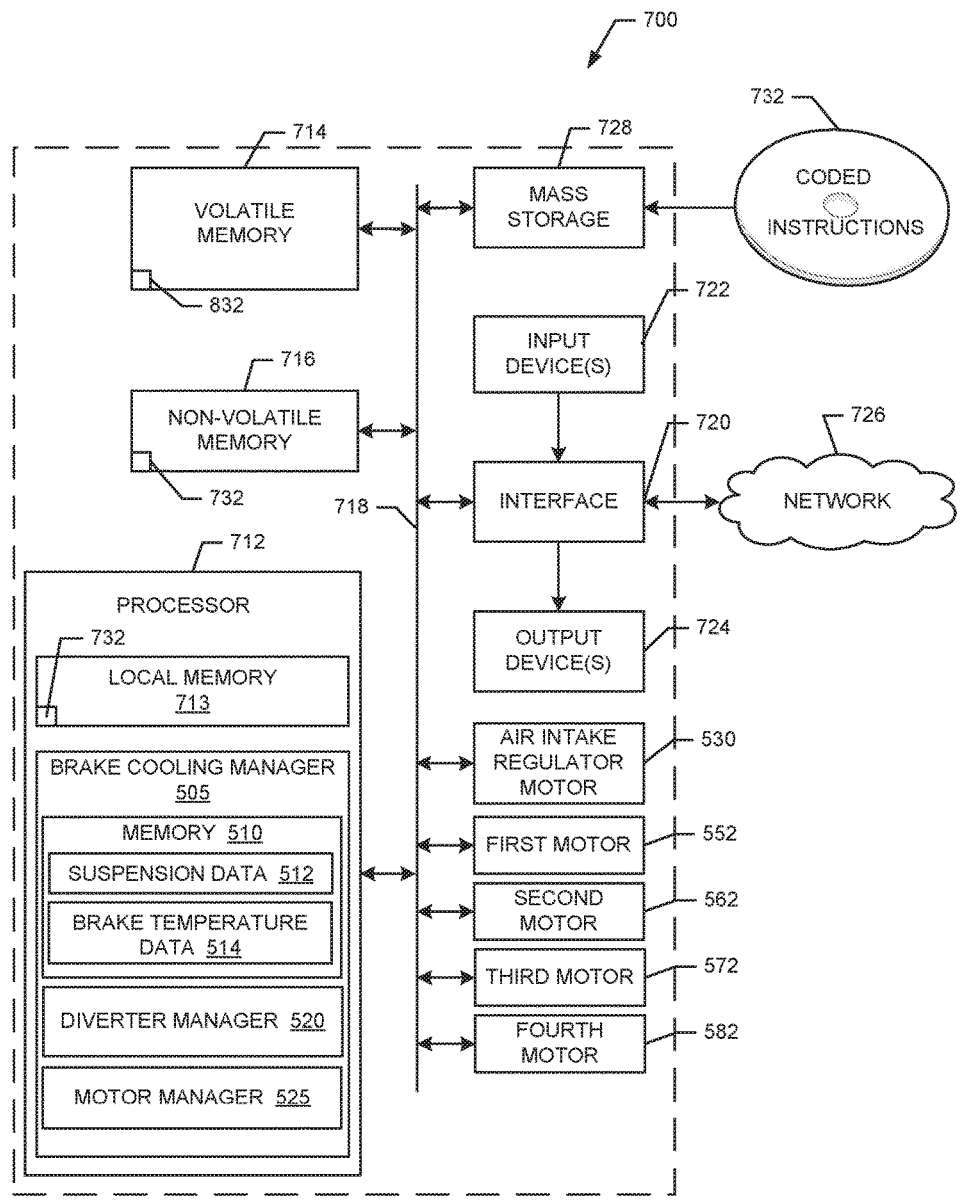
FIG. 7 is a block diagram of an example processor platform which may execute instructions to implement the method of FIG. 6 and the example brake cooling system of FIGS. 1-5.

The processor platform 700 of the illustrated example includes a processor 712. The processor 712 of the illustrated example is hardware. For example, the processor 712 can be implemented by integrated circuits, logic circuits, microprocessors or controllers from any desired family or manufacturer. In the example of FIG. 7, the processor 712 implements the example brake cooling manager 505. As such, it implements the example diverter manager 520 and the example motor manager 525 and may implement the example memory 510.

The processor 712 of the illustrated example includes a local memory 713 (e.g., a cache). The processor 712 of the illustrated example is in communication with a main memory including a volatile memory 714 and a non-volatile memory 716 via a bus 718 (e.g., a Controller Area Network (CAN)). The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory (e.g., 714, 716) is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, input device(s) 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer, speakers, etc.). In some examples, the interface circuit 720 includes a graphics driver card, a graphics driver chip or a graphics driver processor.

In some examples, the example brake cooling manager 505 of the illustrated examples is operatively associated with a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732, represented generally in FIG. 6, may be stored in the mass storage device 728, in the volatile memory 714, in the non-volatile memory 716, and/or on a removable tangible computer readable storage medium such as a CD, DVD or solid-state memory device.

To illustrate, in some examples, rather than an outlet vectoring unit using one or more diverter(s) to vector outlet airflow from a single outlet (e.g., 210 in FIG. 2) in a desired direction, a plurality of outlets could be provided at a plurality of points within a movement envelope of the brake assemblies. For instance, adjacent the example first brake assembly 220, a first outlet could be disposed at or near a high position of the brake assembly movement envelope, a second outlet could be disposed at a resting or default position of the brake assembly movement envelope, and a third outlet could be disposed at a low position of the brake assembly movement envelope. In such example, a diverter within the example first brake cooling duct 200 is controlled by the example brake cooling manager 505 to divert air to one of the first outlet, second outlet or third outlet corresponding to a position of the example first brake assembly 220 determined by the example brake cooling manager 505.

In some examples, one or more of the example first air intake diverter(s) 131, the example second air intake diverter(s) 133, the example third air intake diverter(s) 135, the example fourth air intake diverter(s) 137, the example first diverter(s) 345, the example second diverter(s) 536, the example third diverter(s) 355, and/or the example fourth diverter(s) 540 include an electroactive polymer (e.g., artificial muscles, state-changing materials, etc.), piezoelectric device (e.g., a piezoelectric actuator, etc.) or piezoelectric motor moved via electric fields applied by the example brake cooling manager 505, such as via the motor manager 525.

As another example, the example brake cooling manager 505, or another vehicle control module or vehicle controller, can also control a position of the example first air intake diverter(s) 131 of the example first air intake airflow regulator 130, the example second air intake diverter(s) 133 of the example second air intake airflow regulator 132, the example third air intake diverter(s) 135 of the example third air intake airflow regulator 134, the example fourth air intake diverter(s) 137 of the example fourth air intake airflow regulator 136 and/or the example first diverter(s) 345 of the example first outlet vectoring unit 340, the example second diverter(s) 536 of the example second outlet vectoring unit 538, the example third diverter(s) 355 of the example third outlet vectoring unit 350, and/or the example fourth diverter(s) 540 of the example fourth outlet vectoring unit 542 to affect a lift balance of the example vehicle 100, such as during braking, acceleration, or cornering events.

For instance, the example brake cooling manager 505, or another vehicle control module or vehicle microcontroller, can selectively close the example first air intake diverter(s) 131 of the example first air intake airflow regulator 130 and the example second air intake diverter(s) 133 of the example second air intake airflow regulator 132 and selectively open the example third air intake diverter(s) 135 of the example third air intake airflow regulator 134, the example fourth air intake diverter(s) 137 of the example fourth air intake airflow regulator 136 to alter a lateral lift in the vehicle, such as to enhance a dynamic behavior (e.g., vehicle stability) of the example vehicle 100 during a cornering event. As another example, the example brake cooling manager 505, or another vehicle control module or vehicle controller, can selectively close the example first air intake diverter(s) 131 of the example first air intake airflow regulator 130 and the example third air intake diverter(s) 135 of the example third air intake airflow regulator 134, and selectively open the example third air intake diverter(s) 135 of the example third air intake airflow regulator 134 and the example fourth air intake diverter(s) 137 of the example fourth air intake airflow regulator 136 to alter a fore/aft lift balance (e.g., rear downforce) in the vehicle, to enhance a dynamic behavior of the example vehicle 100 during an acceleration event or a braking event.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A vehicle brake cooling system, comprising:
   a first brake cooling duct extending from a first air intake at a front portion of the vehicle to a first outlet adjacent a first wheel of the vehicle, the first outlet having a first diverter to direct airflow received from the first air intake toward a first brake assembly of the first wheel as the first wheel moves during operation of the vehicle; and
   a brake cooling manager to determine a position of the first diverter responsive to a position of the first brake assembly.

2. The vehicle brake cooling system of claim 1, wherein the position of the first brake assembly is determined from suspension data.

3. The vehicle brake cooling system of claim 2, further including:
   a second brake cooling duct having a second air intake at a front portion of the vehicle and a second outlet adjacent a second wheel of the vehicle, the second outlet having a second diverter to direct airflow from the second outlet toward a second brake assembly for the second wheel as the second wheel moves during operation of the vehicle,
   wherein the brake cooling manager is to determine a position of the second diverter responsive to a position of the second brake assembly.

4. The vehicle brake cooling system of claim 3, wherein the position of the second brake assembly is determined from suspension data.

5. The vehicle brake cooling system of claim 4, further including a first air intake airflow regulator having a first air intake diverter to regulate airflow entering the first brake cooling duct by moving the first air intake diverter to a selected position between and including a fully closed position and a fully open position.

6. The vehicle brake cooling system of claim 5, further including a second air intake airflow regulator having a second air intake diverter to regulate airflow entering the second brake cooling duct by moving the second air intake diverter to a selected position between and including a fully closed position and a fully open position.

7. The vehicle brake cooling system of claim 6, further including:
   a third brake cooling duct having an air intake at a front portion of the vehicle and a third outlet adjacent a third wheel of the vehicle, the third outlet including a third diverter to direct airflow from the third outlet toward a third brake assembly for the third wheel as the third wheel moves during operation of the vehicle; and
   a fourth brake cooling duct having an air intake at a front portion of the vehicle and a fourth outlet adjacent a fourth wheel of the vehicle, the fourth outlet including a fourth diverter to direct airflow from the fourth outlet toward a fourth brake assembly for the fourth wheel as the fourth wheel moves during operation of the vehicle,
   wherein the brake cooling manager is to determine a position of the third diverter responsive to a position of the third brake assembly determined from suspension data, and
   wherein the brake cooling manager is to determine a position of the fourth diverter responsive to a position of the fourth brake assembly determined from the suspension data.

8. The vehicle brake cooling system of claim 7, further including an air intake airflow regulator including an air intake diverter to regulate airflow entering at least one of the first brake cooling duct, the second brake cooling duct, the third brake cooling duct and the fourth brake cooling duct by moving the air intake diverter to a selected position between a fully closed position and a fully open position.

9. The vehicle brake cooling system of claim 8, wherein the air intake airflow regulator includes a first air intake airflow regulator including a first air intake diverter to regulate airflow entering the first brake cooling duct, a second air intake airflow regulator including a second air intake diverter to regulate airflow entering the second brake cooling duct, a third air intake airflow regulator including a third air intake diverter to regulate airflow entering the third brake cooling duct, and a fourth air intake airflow regulator including a fourth air intake diverter to regulate airflow entering the fourth brake cooling duct.

10. The vehicle brake cooling system of claim 9, wherein the position of the third brake assembly and the position of the fourth brake assembly are determined from the suspension data.

11. The vehicle brake cooling system of claim 6, wherein the brake cooling manager includes a diverter manager to determine a position of the first diverter and the second diverter and a motor manager to control a position of the first diverter, the second diverter, the first air intake diverter, and the second air intake diverter.

12. A tangible machine readable storage medium comprising instructions that, when executed, cause a processor to at least:
   determine a position of a brake assembly from vehicle suspension sensor data; and
   actuate a diverter to direct airflow toward the brake assembly as the brake assembly moves during operation of a vehicle.

13. The tangible machine readable storage medium of claim 12, further including instructions that, when executed, cause the processor to actuate the diverter responsive to a brake temperature exceeding a threshold temperature.

14. The tangible machine readable storage medium of claim 12, further including instructions that, when executed, cause the processor to vary airflow through an intake of a brake cooling duct associated with the diverter.

* * * * *